Oct. 16, 1951  E. MERCIER ET AL  2,571,153
APPARATUS FOR CONVERTING RECIPROCATING MOTION TO ROTARY MOTION
Filed Aug. 7, 1948  4 Sheets-Sheet 1
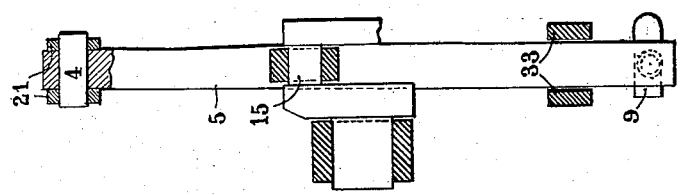
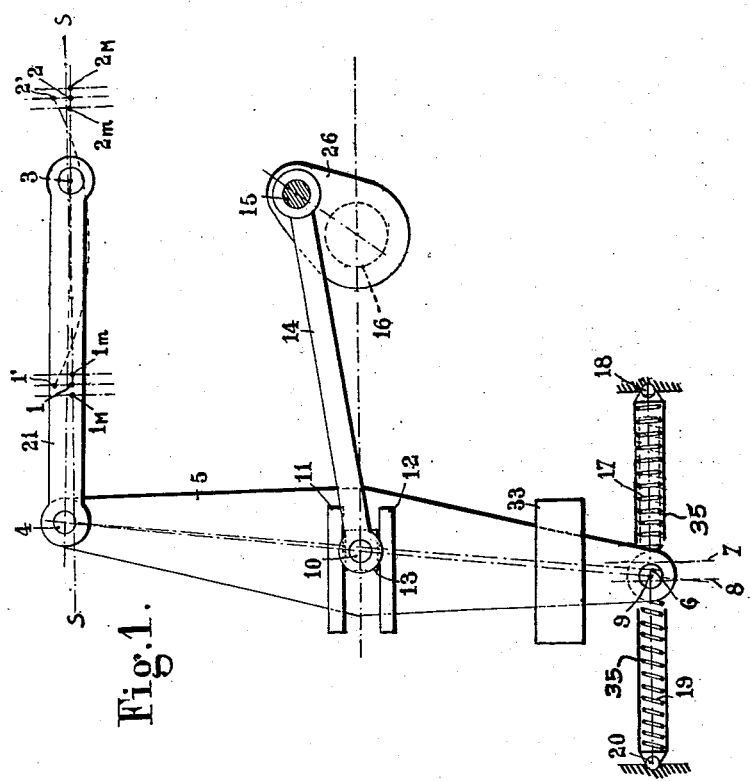
INVENTORS
Ernest Mercier
& Marcel Ehlinger
By George H. Carey
ATTORNEY

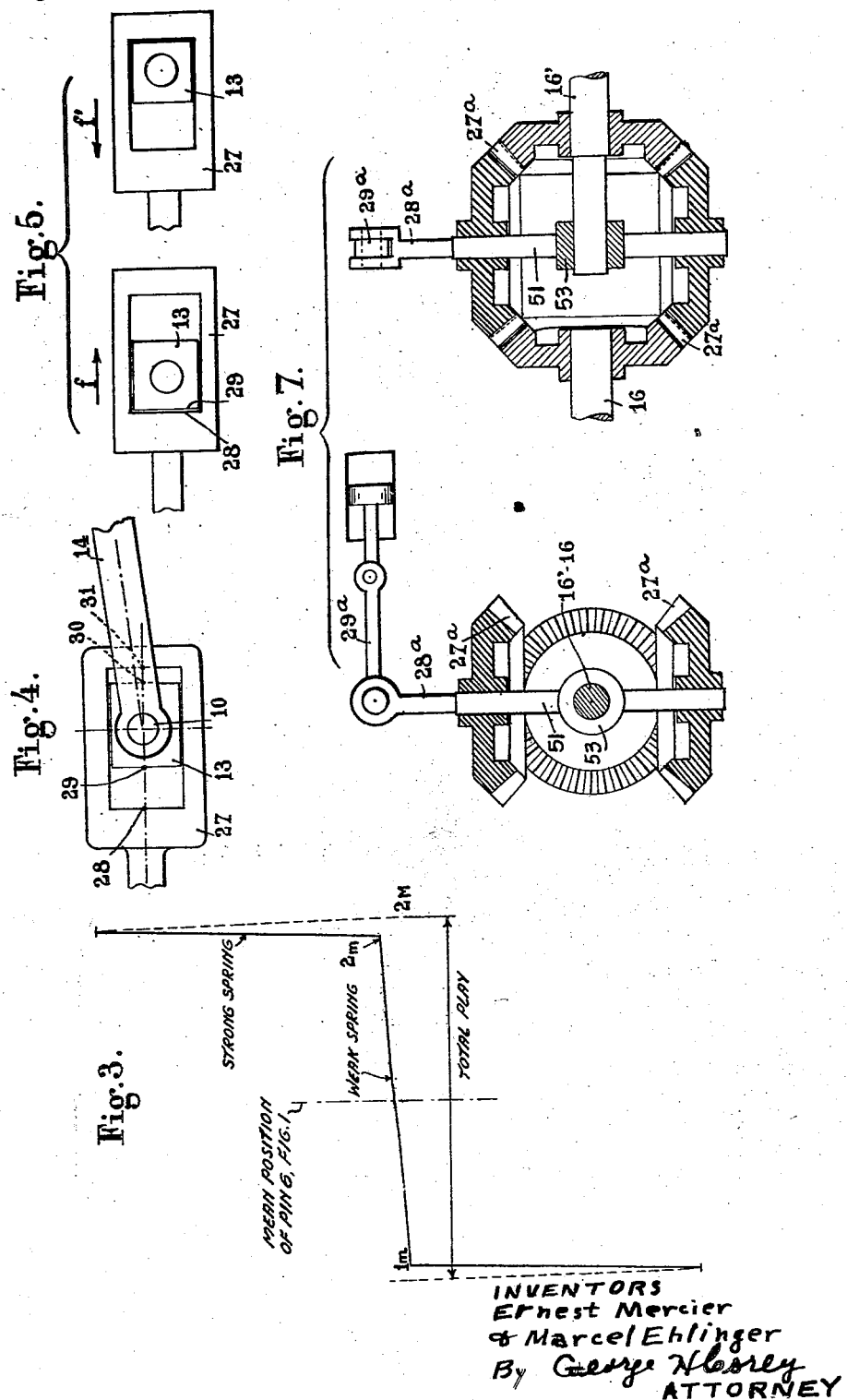

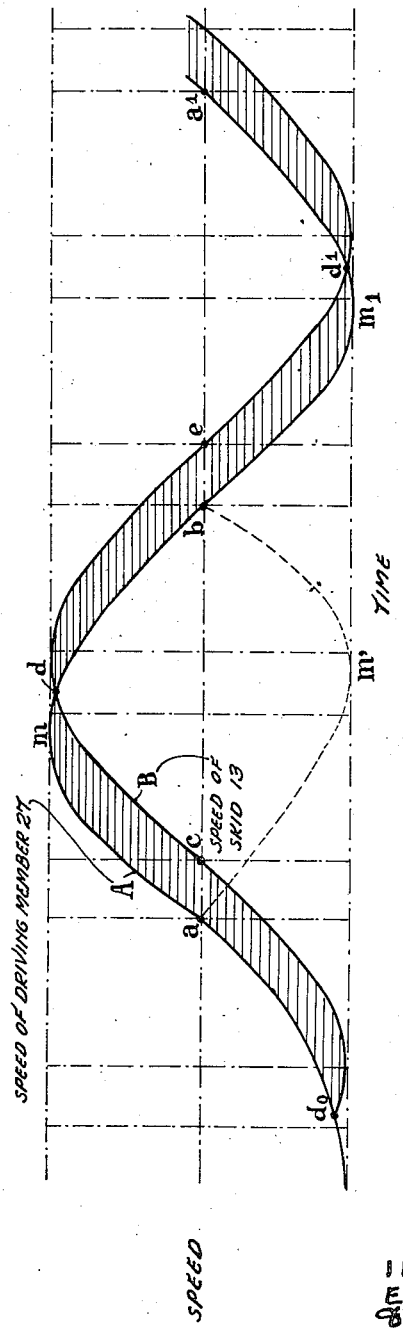

INVENTORS
Ernest Mercier and
Marcel Ehlinger
By George N Corey
ATTORNEY

UNITED STATES PATENT OFFICE 2,571,153

APPARATUS FOR CONVERTING RECIPROCATING MOTION TO ROTARY MOTION

Ernest Mercier and Marcel Ehlinger, Paris, France, assignors, by mesne assignments, to Moore, Inc., Atlanta, Ga., a corporation of Georgia Application August 7, 1948, Serial No. 43,084
In France September 2, 1947

11 Claims. (Cl. 74—40)

This invention relates to transmission apparatus for driving a member in continuous rotation from a driving member moving in reciprocating movement. The invention particularly relates to such transmission apparatus for converting either rectilinear reciprocating movement of a driving member or oscillating movement of such a driving member in an arcuate path to produce substantially uniform rotation of a shaft when the driving member is subject to variation in the speed and length of its movement or stroke.

It has been proposed heretofore to provide for variations in the movement of a reciprocating driving member connected by a transmission gear to a driven member by utilizing an expansible and contractible element interposed in the transmission to take up and to some extent compensate for the variations of the driving member as they occur during the reciprocating movement thereof. In such transmission gear utilizing conventional connecting rods, cranks, shafts and the like one or the other member thereof has been provided with an expansible and contractible element, such as a spring or other resilient member. Although effective to a certain degree for the purpose, such means must be constructed to transmit the force from the driving member to the driven shaft. In such a transmission mechanism, because of the resilient element, the members connecting between the driving and the driven members are not maintained in a definite kinematic relation to each other and to the driven and driving members so that at all points in the movement the intended kinematic and dynamic actions of the driving member upon the driven member are not accomplished.

It is an object of the invention to produce the desired uniform rotation of a driven member concomitant with variations in the length of the stroke of the driving member while maintaining direct kinematic driving connection between the driving and driven members.

It is another object of the invention to produce a substantially uniform rotation of a shaft in synchronism with the reciprocating movement of the driving member and to maintain as well the proper phase relation of the driving member in its reciprocation or oscillation with respect to the rotation of the driven shaft.

A further object of the invention is to provide means for adjusting the phase relation of the driving and driven members.

It is a feature of the invention that the mechanical connections between the driving member and a crank or similar element carried by the driven shaft to produce rotation thereof are constructed so that at each point in the movement of the driving member, whatever may be its speed and whatever may be the length of the stroke or of the arcuate oscillation which is produced, the kinematic drive continuously is maintained between the driving member and the driven member. The construction of the apparatus is such, however, that the variations in the speed or in the length of the stroke of the driving member are compensated so as to produce impulses effective upon the shaft in the forward and reverse strokes of the reciprocating movement of the driving member to produce substantially continuous uniform rotation of the driven shaft synchronous with the reciprocating movement of the driving member. Means also are provided in accordance with the invention for maintaining the proper phase relation between the movements of the driving member and the shaft.

The invention finds particular application in connection with reciprocating prime movers, especially in connection with free piston prime movers, in which variations in length of the stroke of the pistons may occur which unless compensated would produce undesirable variations in the rotational movement of a driven element, such as a crank carried by the driven shaft. The apparatus of the invention may be constructed to provide the kinematic connection between both pistons of a free piston engine to a common shaft driven in rotational movement. As will be more clearly understood from the description of the drawings to follow, the variations in the movement of the driving members, such as the pistons of a free piston engine, are compensated by means which support an element of the kinematic driving mechanism transmitting the force from the driving member to the driven member so that the increments and decrements of force produced by variations in the movements of the driving member and in the speed thereof are taken up by resilient means such as springs cooperating with such supporting means. The mechanical parts of the mechanism are not expansible and contractible to vary the length thereof. No alteration of the manner of connection therebetween is provided for so that the direct continuous kinematic connection between the driving member and the driven member is maintained during the whole cycle of the driving member and corresponding rotation of the driven shaft. The flexibility for securing compensation is obtained by providing for controlled movement of a joint of the mechanism, such as the pivotal support for a lever forming part thereof. Convenient access to the compensating means for adjustment of the resilient element thereof is secured. The apparatus of the invention is capable of compensating for variations in amplitude of the movement or stroke of the reciprocating driving member varying between 10 and 20% from the mean amplitude while maintaining both substantially uniform and sychronous rotation of the driven shaft with respect to the driving member and in phase therewith.

The invention will be more clearly understood in connection with the description to follow of the embodiments thereof shown in the drawings which are given by way of example, and the invention is not to be understood as limited to the particular embodiments shown therein.

Fig. 1 shows a view of the mechanism of the invention in a plane perpendicular to the axis of the driven shaft and parallel to the rectilinear reciprocating movement of the driving member;

Fig. 1b shows a section on line AB of Fig. 1a;

Fig. 2 shows an end view of the apparatus of Fig. 1, certain of the parts for clarity being shown in section;

Fig. 3 shows a typical curve of the resistance of a combination of weak springs and cooperating strong springs for supporting the transmission mechanisms of Fig. 1 or Fig. 1a;

Fig. 4 shows diagrammatically a driving member and a cooperating driven member for producing the effect of the mechanisms of Figs. 1 or 1a;

Fig. 5 shows the parts of the device of Fig. 4 in two different relative positions;

Fig. 6 shows the curves of speed of the driving member and of the member driven thereby through the transmission apparatus of the invention during a cycle of the movement of these members;

Fig. 7 shows a device for insuring the proper phase relation of the driving and driven members.

Figure 1A:
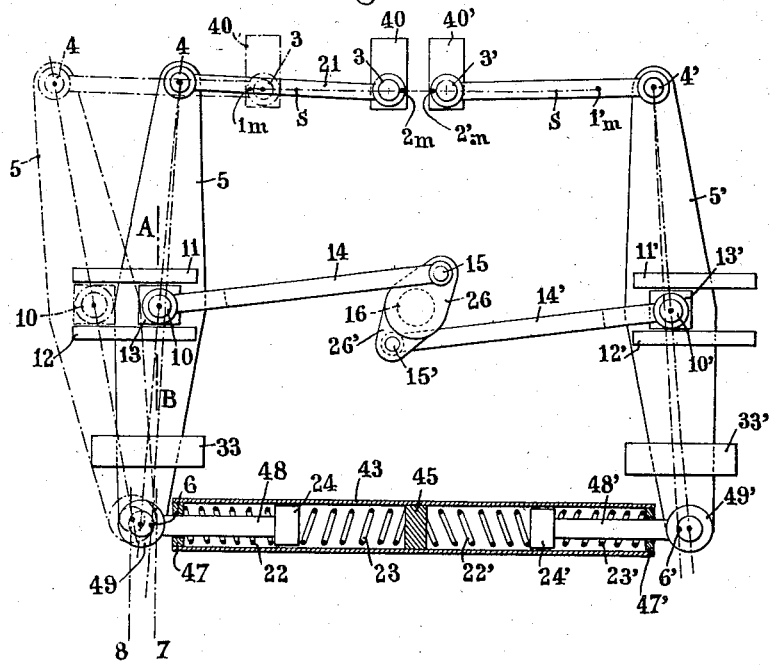
Fig. 1a shows a modification of the apparatus of Fig. 1 for driving a shaft from two driving members oppositely reciprocatable along a common rectilinear line of movement.

In Fig. 1 the dot and dash line SS drawn through the points 1M, 1, 1m, 3, 2m, 2 and 2M represents the rectilinear path of movement of a driving member reciprocating movement of which is effected with varying amplitude in this path by a power means. The points 1 and 2 represent the limits of the mean amplitude of movement of the axis of a pin 3 which is carried by the driving member 3 moving in the line SS. In the position shown in Fig. 1 the pin 3 is at a point intermediate between the limits of the reciprocating movement and more nearly adjacent the point 2 than the point 1 to correspond to the positions of the other parts shown in this figure which connect the driving member to the driven shaft. The points 1M, 2M represent the limits of the maximum amplitude of movement of the driving member and its pin 3. The points 1m and 2m represent the minimum amplitude of such reciprocating movement.

It will be understood with respect to Fig. 1 that instead of supporting the driving member and its pin 3 for movement in the rectilinear path SS this member may be supported, for example, at the outer end of a pivoted arm, the pin 3 carried by such arm then moving in the arc of a circle, for example between the points 1' and 2' representing the mean arcuate movement of this member and pin. For simplicity the invention will be described in connection with both Figs. 1 and 1a in its embodiment in which the driving member and its pin 3 move in the rectilinear path SS.

In Fig. 1 a link 21 is pivotally connected at pin 3 to the reciprocating driving member so that the pivotal axis of this link at the right hand end thereof in Fig. 1 moves in the line SS. The left hand end of the link 21 pivotally engages pin 4 fixed at the upper end of a lever 5, this lever being supported at the lower end thereof, Fig. 1, for pivotal movement upon a pin 6. It is apparent that if the pin 6 is assumed to be fixed the axis of the pin 4 at the upper end of the lever will move in the arc of a circle and the link 21 as with any conventional connecting rod will pivot upon the pin 3 to accommodate to the throw which occurs due to the arc of movement of the pin 4.

In the embodiment of Fig. 1 at approximately the middle of the length of the lever 5 between the axis of the pin 4 and the axis of the pin 6 this lever carries a stud 10 fixed thereto with which is pivotally engaged the left hand end of a connecting rod 14 the right hand end of which is carried by crank pin 15 of the crank 26 fastened on the shaft 16 to which it is desired to give uniform rotational movement.

At the lower end of the lever 5 in the embodiment of Fig. 1 the pivot pin 6 is supported to provide a certain amount of freedom of movement of this pivotal axis of the lever. This pin is supported so that it can take up any position between certain limits determined by two vertical planes perpendicular to the plane of Fig. 1 and represented by the lines 7, 8. This freedom of movement is controlled by the action of the two opposed springs extending horizontally in alignment with the pin 6. The spring 17 at the right hand end thereof is fastened to a bearing pin 18 bearing in pivotal relation to and against a fixed abutment. A spring 19 at the opposite side of the pin 6 from the spring 17 is fastened at its left hand end to a bearing pin 20 also in pivotal bearing on the fixed abutment at this side. The ends of the springs 17 and 19 adjacent lever 5 are adapted for pivotal bearing upon the pin 6. Movement of the pin 6, therefore, in the direction perpendicular to the planes 7, 8 tends to effect compression of one spring upon expansion of the other. These springs may be supported in suitable sheaths 35 carried by the pivots 18 and 20 to maintain the alignment of the springs while also providing sufficient flexibility so that some movement of the pin 16 may take place in the direction parallel to the planes 7, 8. The bearing pins 18 and 20 provide for pivotal movement of the springs when such movement of the pin 6 takes place.

If desired each of the springs 17 and 19 may be made up of two springs assembled in series, one of these springs being a weak spring which allows the pin 6 to move with relatively small resistance in the direction perpendicular to the planes 7, 8 and the other a strong spring which opposes a high resistance to the movement of the pin 6 as soon as the weak spring has reached the limit of its compression. Fig. 3 is a diagram showing the resistance which is brought upon movement of the pin 6 in departing from the mean position by such a combination of springs. As the pin 6 departs from the mean position indicated by the dot and dash lines in Fig. 3 the resistance of the weak spring at the corresponding side of the pin 6 increases slowly until the limit of compression of this spring is reached with a corresponding amount of movement of the pin 6, for example toward the right in Fig. 3. Thereupon the strong spring begins to be compressed and the resistance rises rapidly until this spring is compressed to the desired limit corresponding to the total movement of the pin 6 toward the right in Fig. 3. The portion of the curve shown at the left of the mean position of Fig. 3 represents corresponding movement and resistance of the springs at the opposite side of the pin 6 when this combination of springs is used.

As shown in Fig. 1 pivotally supported on the stud 10 is a skid member 13 which, however, is translatable with the lever 5 since the stud 10 is fixed to this lever. This skid member 13 is of rectangular shape as shown in Fig. 1 so as to cooperate at its opposite faces with two fixed slides 11 and 12, the faces of these slides against which the skid 13 slidably bears extending generally transversely of the lever 5, that is, generally parallel to the line of reciprocating movement of the driving pin 3 and generally parallel to the line of action of springs 17 and 19. It thus will be apparent that the slides 11 and 12 provide for freedom of rectilinear movement of the stud 10 transversely of the lever 5 but that this stud is confined against movement lengthwise of the lever 5. Movement of the pin 4 may take place in the general direction parallel to the line SS to follow the movement of the pin 3 of the driving member connected thereto by the link 21 concomitantly with the rectilinear movement of the stud 10. It also will be apparent that the pin 6 may move transversely of the planes 7, 8 and that the movement of this pin in the direction parallel to the planes 7, 8 will be limited to the throw of the pin 6 which may occur because of pivotal movement of the lever 5 upon the stud 10. The actual movements of the pin 4 and of the pin 6, therefore, may not be upon true circles as if the lever 5 were pivoted at its middle upon a stationary stud but the movements of these pins at any instant will be upon circular arcs upon the axis of the stud 10 and these instantaneous paths will be shifted toward the left or toward the right in Fig. 1 according as the stud 10 is moved in the operation of the apparatus in transmitting movement from the driving member and its pin 3 to the crank pin 15.

It will be understood from the above discussion and a consideration of Fig. 1 that uniform rotational movement of the crank pin 15 about the axis of the shaft 16, if the pin 6 were held in a given mean plane between planes 7 and 8, would require a certain predetermined characteristic of speed of the driving pin 3 along the path SS and for each successive equal arcuate increment of movement of the crank pin 15 a predetermined position of the pin 3 would be required. The total movement or stroke of the pin 3 thus would be predetermined. Since, however, variations in the speed and total stroke of the driving member and its pin 3 may occur, in order to maintain uniform rotational movement of the crank pin 15 and of the shaft 16 the pivot pin 6 of the lever 5 must be permitted to move, toward the left or toward the right in Fig. 1 as the case may be, to compensate for the variations occurring during a stroke and for the total movement or stroke of the driving member.

If rotation of the shaft 16 were absolutely uniform and the length of the connecting rod 14 with respect to the radius of the crank arm 26 between the axis of the shaft 16 and the crank pin 15 were sufficiently large the speed of movement of the skid 13 and the stud 10 along the fixed slides 11, 12 in each direction would vary substantially along a sinusoidal curve. The apparatus of the invention may be constructed in accordance with Fig. 1 with suitable practical proportions for the parts for accomplishing compensation for the variations in the speed and movements of the reciprocating driving member by virtue of the yielding support of the pivotal pin 6 afforded by springs 17, 19 and by virtue of the guiding of the skid 13 and stud 10 in a rectilinear path. The springs 17 and 19 supporting the pin 6 and controlling its movement as above described provide the requisite accommodation of the movement at the upper end of the lever 5 to the desired approximately sinusoidal speed characteristic of the skid 13 and the stud 10 with the result that the movement applied to the connecting rod 14 at the stud 10 may be such as substantially to maintain the uniform rotation of the shaft 16.

Figure 1B:
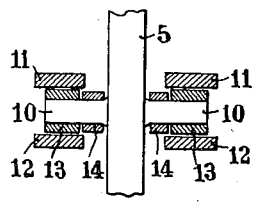

In the embodiment of Figs. 1a and 1b a transmission device utilizing two levers 5 and 5' is shown which is adapted, for example, to transmit the movements of the two pistons of a free piston engine. Connected to the levers 5, 5' respectively are the links 21 and 21' as well as the connecting rods 14, 14' in the same manner as described in connection with Fig. 1. These connecting rods respectively cooperate with the skids 13, 13' and studs 10, 10' sliding in their respective slides 11, 12 and 11', 12' to transmit movement from two oppositely reciprocating members 40, 40' driven by the free pistons to crank pins 15, 15' disposed at 180° from each other about the shaft 16. The pin 3 of the driving member 40 may move along the path SS between the points 1m and 2m. The full line outlines in Fig. 1a show the position of the parts when the pin 3 is adjacent to but somewhat removed from the point 2m. The dot and dash outline in Fig. 1a shows the position of the parts associated with lever 5 when the pin 3 has reached a position adjacent to but not yet coincident with the limit of movement at point 1m. It will be understood from the previous description in connection with Fig. 1 that the distance between the points 1m and 2m may represent the mean amplitude of the reciprocating movement or stroke of the member 40 and that the movement of the pin 3 may be reversed at either side of points 1m, 2m depending upon the variations in the forces such as those produced in a free piston engine which are brought upon the member 40 which may produce variations in the stroke. The reciprocating member 40' likewise moves between limits which at each end of its stroke may be at either side of the points 1m' and 2m'.

It will be apparent that the movements of the studs 10, 10' both of which are desired to be of generally sinusoidal character with respect to the speed thereof along the guides 11, 12 and 11', 12' will be the same but in opposite directions at each instant as the crank pins 15, 15' move in uniform rotation about the axis of the shaft 16. The movement and variations of movement of the driving member 40' and its pin 3' may be the same as or may be different from those of member 40 with respect to the speed and the force transmitted thereby to the lever 5' as compared with the lever 5. In the embodiment of Fig. 1a to compensate for the variations in speed and force of both driving members 40 and 40' as well as the total movement thereof a set of four springs 22, 23, 22', 23' are provided. The springs 22, 23 are separated by a piston 24 sliding in a tubular member 43. The spring 23 bears against a central abutment 45 fastened in the tubular member 43 adjacent the middle of its length. Similarly the springs 22', 23', are separated by piston 24' slidable in the tubular member 43. At its opposite ends the tubular member is closed by bushings 47, 47' having openings therein respectively for the piston rods 48, 48' which carry hubs 49, 49' at their respective outer ends which are in pivotal engagement respectively with the pins 6 and 6' which are fastened to the respective levers 5, 5' at the ends thereof opposite to the pins 4 and 4' to which, as in Fig. 1, links 21 and 21' are connected. It will be apparent from a consideration of Fig. 1a, having regard to the action described in connection with Fig. 1, that the springs 22, 23 and 22', 23' bearing against the abutments 45, 47, 47' cooperate with the respective levers 5 and 5' to compensate for the variations in the movements and speeds of the respective driving members 40, 40'. In the embodiment of Fig. 1a as the springs 22 and 23 and the springs 22' and 23' are at opposite sides of their respective pistons 24 and 24' they are effective to resist the movement of the corresponding pins 6 and 6' as these pins depart at either side from the mean position, such resistance utilizing the reaction of the other springs at the opposite side of the abutment 45 and of the other lever connected to its movable member 40, 40'. Thus the springs 22, 23 and 22', 23' cooperate to function with respect to the corresponding levers 5, 5' as do the springs 17, 19 to compensate for the variations in the movements and speed of both members 40, 40' and of the pistons to which they may be connected.

Because it is necessary that the crank 26' shall be offset from the crank 26 along the shaft 16 the lever 5 and the lever 5' may reciprocate in different parallel planes. The connection to lever 5 of the piston rod 48 which is in line in the tubular member 43 with the piston rod 48' may be effected by means of the hub 49 at the opposite side of this lever 5 from the connection of the piston rod 48' by means of its hub 49' to the lever 5'. This offset tends to produce some torsional stress acting on the levers 5 and 5'. To counteract the tendency to displace these levers from the proper planes of action thereof, the guides 33 and 33' as shown in Fig. 1a are provided at either side of these levers for this purpose.

In order to analyze the operation it should be noted that the device operates as if the skid 13 were acted on directly by a movable member actuated with a reciprocating motion similar to the movement of the point 3 but on half the scale, the movement of the skid 13 being modified through the medium of hinging the lever 5 upon a movable pivot controlled and limited by springs. Figure 4 shows such an equivalent means including the skid 13 and its pin 10 and the foot end of the connecting rod 14 pivoting on pin 10. The skid 13 is slidable within a frame 27 which will be assumed to be actuated with a reciprocating motion of reduced amplitude relative to the motion of pin 3 and which will retransmit its movement to the skid as soon as the points 28 and 29, or the points 30 and 31, will have come into contact with each other, the total free play allowed being equal to the sum of the two distances 28, 29 and 30, 31. The springs of this mechanism have not been shown but act as do springs 17 and 19 (Fig. 1). Indeed it can be stated that the action of the mechanism of Fig. 4 may be quite identical with that of the mechanism previously described in connection with Fig. 1 on condition that the proportions thereof be correctly defined.

At the time of a contact of the skid 13 with the frame 27 at one end thereof the respective position of the two movable members, the driving member 27 and the driven member 13, will be for instance that of Fig. 5, left side. The driving member 27 gives to the driven member 13 an impulse producing movement of the skid relative to the frame in the direction of the arrow $f$. In order that the operations of synchronization be correctly carried out the action of the movable member 27 must be such as to permit the movable member 13 to move freely after receiving its impulse, the point 29 moving away gradually from 28. During the course of the separation which follows, movable members 27 and 13 come into the right hand position of Fig. 5. A new contact is effected and, as the movement becomes reversed in the interval, the driving member 27 gives to the driven member 13 an impulse producing a motion in the direction of the arrow $f'$. The result is that the turning effort applied to the crank pin 15 produces a substantially uniform speed of the shaft 16.

In short, the action of the driving member on the driven member will be reduced to a series of impulses all of them in the direction of maintenance of the movement of the shaft 16 at the rate of an impulse per half revolution of said shaft. These are the necessary conditions for establishing a continuous rotary movement, substantially uniform and synchronous.

In Fig. 6, curve A has been drawn representing the speed of the driving member 27 as a function of time. The shape of this curve is derived from an analytic study of reciprocating free piston machines. The arc $amb$ represents the variation of speed for a given stroke of a piston. The dotted arc $bm'a$ represents the variation of speed during the course of the following stroke. To represent these speeds there has been taken the arc $bm_1a_1$, symmetrical with $bm'a$ in relation to the ordinate $b$. There is thus the advantage of developing the time along the X-axis, and it is only necessary to remember that the negative speeds below the horizontal median line in Fig. 6 correspond to movements from the right toward the left in Fig. 4, the positive speeds corresponding to movements from the left toward the right in Fig. 4. There has also been drawn in Fig. 6 curve B which is that of the speed of the driven movable member 13 for a uniform movement synchronous with the shaft 16. With a sufficiently long rod this second curve is nearly sinusoidal. The driven member 13 lags behind the driving member 27 in changing its speed so that the curve B is offset toward the right by a certain horizontal distance measured between the times $a$ and $c$. These two curves A and B intersect first at point $d$, and again at point $d_1$, these intersections representing the times when the driving member 27 whose speed is rising along

*amd* and is higher than the speed of the driven member 13 overtakes the member 13 and makes contact therewith as at 28, 29, Fig. 5.

It will be seen that before a contact, such as that which occurs at *d*, the speed of the driving member is higher than that of the driven member and that this speed becomes lower than that of the driven member after such contact. As soon as the contact is made and the impulse transmitted, the two movable members separate and the shaft 16 freely turns until the next contact.

With the device as shown in Figs. 4 and 5 the two movements are not yet in phase. The mechanism must, therefore, be completed so that the phases may be in step. For this purpose, the shaft 16, Fig. 7, is connected to a differential train through which it drives shaft 16' arranged in the prolongation of its axis. The train of planet wheels 27a is furnished with a control arm 28a which may be an extension of the spider arm 51 carried by hub 53 pivotally supported on the shaft 16'. To this arm 28a is connected a mechanism which is diagrammatically represented by a link 29a connected to a driving piston. By suitably moving said control arm 28a to shift gear 27 about the axis of shaft 16 the shaft 16' may be angularly offset in relation to the shaft 16 so as to insure the coincidence of the phases for the shaft 16' and for all the mechanisms which it may drive. As the amplitude of the reciprocating movement is a function of the power, the control arm mechanism 28a may be, for instance, dependent upon a power controller of the reciprocating machine.

When the foregoing construction is applied to a machine with free pistons having two movable members reciprocating in opposite directions, the symmetrical mechanism of Fig. 1a driven by the two movable members 40, 40' may be used and the addition of the auxiliary shaft 16' cooperating with the mechanism kinematically connected between the members 40, 40' and the shaft 16 is of great importance for it makes it possible, by means of a suitable calculation of the resistance of the mechanisms, to furnish these machines with means, for example a fly wheel, for compensating for variations in speed and stroke and thereby considerably increasing their stability in running as well as mechanically to control the distribution valves, which is necessary for example to operate a four cycle engine, and to control the injection pumps by means of ordinary cams as in ordinary internal combustion engines.

We claim:

1. A transmission mechanism between a driving member actuated with a to-and-fro motion of variable amplitude and a driven crankshaft to which it is necessary to give a continuous rotary motion comprising a lever of which one point is connected to the driving member by a link and another point is connected by a rod to the crank pin of the driven crankshaft, said mechanism being characterized by means for pivotally supporting said lever so that said lever is only connected to fixed bearings through said pivotal support and through the medium of springs which it deforms alternatively according to the direction of the resultant of the stresses exerted on said lever by the driving and driven members.

2. A mechanism serving to give to a crankshaft a continuous rotation by means of a driving member actuated with a to-and-fro motion, comprising a lever, a link hinged on the crank pin of said crankshaft and on a point of said lever, another link hinged on said driving member and on another point of the lever, fixed stops, and spring intercalated between a third point of the lever and said fixed stops, said lever having no point liable to remain fixed.

3. A transmission mechanism for driving a double crank crankshaft with a continuous rotary motion from two reciprocating pistons actuated with a to-and-fro motion of variable amplitude, comprising two levers, two links respectively connecting the two pistons to the ends of the respective levers, fixed stops, springs respectively connecting said stops to the other ends of said levers to provide bearing of said levers against said stops in opposition to said springs, and links connecting an intermediary point of each lever to a respective crank.

4. Transmission mechanism for converting reciprocating motion to a rotary motion which comprises a driving member supported for reciprocating movement thereof in a predetermined path of movement, the amplitude of said movement being subject to variation, a crank and crank pin supported for rotation thereof on the axis of the crank to move said crank pin about the axis of said crank in a plane generally parallel to the movement of said driving member, a lever, lever pivot means for pivotally supporting said lever at a given point thereon upon an axis generally parallel to and spaced from said crank axis, means cooperating with said lever to provide for reciprocating movement of a second point thereon spaced therealong from said pivot means in a path of movement generally parallel to the path of movement of said driving member, a connecting rod pivotally engaging said lever at said second point and extending between said second point and said crank pin and pivotally engaging said crank pin for driving said crank in rotation upon said reciprocating movement of said second point of said lever, a link extending between said driving member and said lever and pivotally engaging said driving member and pivotally engaging said lever at a point thereon removed therealong from said lever pivot means for effecting reciprocating pivotal movement of said lever upon reciprocating movement of said driving member, means for supporting said lever pivot means so as to provide for movement thereof and of said pivotal axis thereof generally parallel to said path of movement of said driving member, and means operatively connected to said lever pivot means and actuated upon said movement of said pivotal axis thereof for limiting said movement of said axis to compensate for said variations in the amplitude of said movement of said driving member concomitantly with the movement of said second point of said lever in said path generally parallel to the movement of said driving member.

5. Transmission mechanism for converting reciprocating motion to a rotary motion which comprises a driving member supported for reciprocating movement thereof in a predetermined path of movement, the amplitude of said movement being subject to variations, a crank and crank pin supported for rotation thereof on the axis of the crank to move said crank pin about the axis of said crank in a plane generally parallel to the movement of said driving member, a slide member, means for supporting said slide member for reciprocating movement thereof in a path generally parallel to the path of movement of said driving member, a connecting rod extending between and pivotally engaging said slide member and said crank pin for driving said crank in rotational movement thereof upon reciprocating movement of said slide member, a lever carried by said slide member for movement therewith in said path and for pivotal movement of said lever in relation to said slide member, lever pivot means for pivotally supporting said lever at a point therealong from said slide member, a link extending between and pivotally engaging said driving member and said lever for effecting pivotal reciprocating movement of said lever and reciprocating movement of said slide member upon reciprocating movement of said driving member, means for supporting said lever pivot means to provide for movement thereof in the direction generally parallel to said path of movement of said driving member to compensate for said variations in the amplitude of said movement of said driving member concomitantly with the movement of said slide member determined by the rotation of said crank on its axis, and means cooperating with said lever pivot means resiliently to oppose said movement thereof generally parallel to said path of movement of said driving member.

6. Transmission mechanism for converting a reciprocating motion to a rotary motion which comprises a driving member supported for reciprocating movement thereof in a predetermined path of movement, the amplitude of said movement being subject to variation, a shaft supported for rotation thereof upon its axis, a crank and crank pin carried by said shaft to move the axis of said crank pin about the axis of said shaft, a lever, lever pivot means for pivotally supporting said lever adjacent one end thereof upon an axis parallel to and spaced from said shaft axis, a stud fixed upon said lever at a point removed therealong from said lever pivot means, the axis of said stud being parallel to said lever pivot axis, a slideway adjacent said stud fixed in spaced relation to the axis of said shaft and having its slideway surface extending generally parallel to the direction between said stud and said axis of said shaft, a slide member pivotally carried on said stud and adapted for sliding engagement with said slideway surface for reciprocating movement therealong, a connecting rod extending between and pivotally engaging said crank pin and said stud for driving said crank and said shaft in rotation upon sliding movement of said slide member and said stud along said slideway surface, means for supporting said lever pivot means so as to provide for movement thereof generally parallel to said slideway surface as well as for movement thereof generally transversely of said slideway surface, means cooperating with said pivot means resiliently to oppose said movements thereof generally parallel to said slideway surface, and a link extending between said driving member and said lever and pivotally engaging said driving member and pivotally engaging said lever at a point on said lever removed therealong from said pivot means thereof to effect reciprocating movement of said lever and said stud and rotation of said shaft concomitantly with reciprocating movement of said driving member.

7. Transmission mechanism as defined in claim 6 which comprises a second driving member supported for reciprocating movement thereof in a predetermined path of movement, a second crank and crank pin carried on said shaft in angularly spaced relation about the axis of said shaft from said first crank and crank pin, a second lever, lever pivot means for pivotally supporting said second lever adjacent one end thereof upon an axis parallel to and spaced from said shaft axis in opposed relation to said first pivot means with respect to said shaft axis, a stud fixed upon said second lever at a point removed therealong from said pivot axis thereof, the axis of said stud being parallel to said pivot axis of said second lever, a slideway adjacent said stud of said second lever fixed in spaced relation to and at the opposite side of said shaft from said first slideway and having its surface extending generally parallel to said first slideway, a slide member pivotally carried on said second stud and slidably engaging said second slideway surface for reciprocating movement therealong, a connecting rod extending between and pivotally engaging said second crank pin and said second stud for driving said second crank and said shaft in rotation upon sliding movement of said second slide member and said second stud along said second slideway surface, means for supporting said second lever pivot means so as to provide for movement thereof generally parallel to said second slideway surface as well as for movement thereof generally transversely of said slideway surface, means cooperating with said second lever pivot means for resiliently opposing said movements thereof generally parallel to said slideway surfaces, and a link extending between said second driving member and said second lever and pivotally engaging said second driving member and pivotally engaging said second lever at a point on said second lever removed therealong from said pivot means thereof to effect reciprocating movement of said lever and said stud and rotation of said shaft concomitantly with reciprocating movement of said second driving member.

8. Transmission mechanism for converting reciprocating motion to a rotary motion which comprises a driving member supported for reciprocating movement thereof in a predetermined path of movement, the amplitude of said movement being subject to variation, a crank and crank pin supported for rotation thereof on the axis of the crank to move said crank pin about the axis of said crank, a lever, lever pivot means for pivotally supporting said lever at a given point thereon upon an axis spaced from said crank axis, means cooperating with said lever to provide for reciprocating movement in a predetermined path of a second point on said lever spaced therealong from said pivot means, a connecting rod pivotally engaging said lever at said second point and extending between said second point and said crank pin and pivotally engaging said crank pin for driving said crank in rotation upon said reciprocating movement of said second point of said lever, a link extending between said driving member and said lever and pivotally engaging said driving member and pivotally engaging said lever at a point thereon removed therealong from said lever pivot means for effecting reciprocating pivotal movement of said lever upon reciprocating movement of said driving member, means for supporting said lever pivot means so as to provide for movement thereof and of said pivotal axis thereof in a predetermined path of movement concomitantly with said reciprocating movement of said driving member in its predetermined path and concomitantly with said reciprocating movement of said second point of said lever in its predetermined path, and means operatively connected to said lever pivot means and actuated upon said movement of said pivotal axis thereof for limiting said movement of said pivotal axis in its predetermined path to compensate for variations in the amplitude of said movement of said driving member.

9. Transmission mechanism for converting reciprocating motion to a rotary motion which comprises a driving member supported for reciprocating movement thereof in a predetermined path of movement, the amplitude of said movement being subject to variation, a crank and crank pin supported for rotation thereof on the axis of the crank to move said crank pin about said axis of said crank, a lever, lever pivot means for pivotally supporting said lever at a given point thereon upon an axis spaced from said crank axis, a connecting rod engaging said lever at a second point thereon spaced therealong from said pivot means and extending between said second point and said crank pin and pivotally engaging said crank pin for driving said crank in rotation upon pivotal reciprocating movement of said lever, a link extending between said driving member and said lever engaging said driving member and engaging said lever at a point thereon removed therealong from said lever pivot means for effecting said reciprocating pivotal movement of said lever upon reciprocating movement of said driving member, means for supporting said lever pivot means so as to provide for movement thereof and of said pivotal axis thereof in a predetermined path of movement concomitantly with said reciprocating movement of said driving member in its predetermined path and concomitantly with reciprocating movement of said second point of said lever upon pivotal movement of said lever, and means operatively connected to said lever pivot means and actuated upon said movement of said pivotal axis thereof for limiting said movement of said pivotal axis in its predetermined path to compensate for said variations in the amplitude of said movement of said driving member.

10. Transmission mechanism as defined in claim 9 which comprises a driven rotatable member, means operatively connecting said crank to said rotatable member for driving said rotatable member upon rotation of said crank, means cooperating with said connecting means to provide for rotation of said rotatable driven member with respect to said crank while maintaining said driving connection therebetween, and means operatively connected to said cooperating means and actuatable for operating said cooperating means to effect rotation of said rotatable driven member with respect to said crank.

11. Transmission mechanism as defined in claim 9 which comprises a driven rotatable member, means operatively connecting said crank to said rotatable member for driving said rotatable member upon rotation of said crank, a differential mechanism cooperating with said connecting means to provide for rotation of said rotatable driven member with respect to said crank while maintaining said driving connection therebetween, and means operatively connected to said differential mechanism and said connecting means and actuatable for operating said differential mechanism and said connecting means to effect rotation of said rotatable driven member with respect to said crank.

ERNEST MERCIER.
MARCEL EHLINGER.

REFERENCES CITED

The following references are of record in the file of this patent:

UNITED STATES PATENTS

| Number | Name | Date |
| --- | --- | --- |
| 7,902 | Harris | Jan. 14, 1851 |
| 216,578 | Schweikhard | Jan. 17, 1879 |
| 547,184 | Saunders | Oct. 1, 1895 |
| 610,488 | Hugus | Sept. 6, 1898 |